United States Patent
Rae et al.

(10) Patent No.: US 6,173,778 B1
(45) Date of Patent: *Jan. 16, 2001

(54) STORABLE LIQUID SYSTEMS FOR USE IN CEMENTING OIL AND GAS WELLS

(75) Inventors: Philip J. Rae, Singapore (SG); Neil Johnston, Aberdeenshire (GB); Gino DiLullo, Caracas (VE)

(73) Assignee: BJ Services Company, Houston, TX (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/085,667

(22) Filed: May 27, 1998

Related U.S. Application Data

(60) Provisional application No. 60/048,718, filed on May 28, 1997.

(51) Int. Cl.$^7$ .................................................. E21B 33/13
(52) U.S. Cl. ......................................... 166/293; 106/730
(58) Field of Search ..................... 166/285, 292, 166/293, 294, 295; 106/730, 724, 726

(56) References Cited

U.S. PATENT DOCUMENTS

| | | |
|---|---|---|
| 2,911,365 | 11/1959 | Burland et al. . |
| 3,730,900 | 5/1973 | Perricone et al. ............... 252/8.5 C |
| 3,989,534 * | 11/1976 | Plunguian et al. ...................... 106/86 |
| 4,021,545 | 5/1977 | Nair et al. ............................ 424/180 |
| 4,022,633 * | 5/1977 | Schneider ............................. 106/208 |
| 4,336,145 | 6/1982 | Briscoe ............................ 252/8.55 R |
| 4,350,601 | 9/1982 | Mosier et al. ................... 252/8.55 R |
| 4,371,443 | 2/1983 | Keeney ........................... 252/8.55 C |
| 4,415,463 | 11/1983 | Mosier et al. ................... 252/8.55 R |
| 4,417,415 | 11/1983 | Cysewski et al. ...................... 47/1.4 |
| 4,425,241 | 1/1984 | Swanson .......................... 252/8.5 C |
| 4,439,328 | 3/1984 | Moity .............................. 252/8.5 LC |
| 4,451,377 | 5/1984 | Luxemburg .......................... 210/708 |
| 4,466,890 | 8/1984 | Briscoe ............................ 252/8.55 R |
| 4,476,029 | 10/1984 | Sy et al. . |
| 4,487,867 | 12/1984 | Almond et al. ......................... 524/42 |
| 4,488,910 | 12/1984 | Nicholson et al. ..................... 106/90 |
| 4,488,975 | 12/1984 | Almond .......................... 252/8.55 R |
| 4,518,040 | 5/1985 | Middleton ............................ 166/307 |
| 4,561,985 | 12/1985 | Glass, Jr. ......................... 252/8.5 A |
| 4,571,422 | 2/1986 | Symes et al. ......................... 536/114 |
| 4,627,495 | 12/1986 | Harris et al. ......................... 166/280 |
| 4,676,832 | 6/1987 | Childs et al. ........................... 106/90 |
| 4,679,631 | 7/1987 | Dill et al. ............................. 166/307 |
| 4,683,954 | 8/1987 | Walker et al. ........................ 166/307 |
| 4,696,677 | 9/1987 | Colegrove et al. . |
| 4,753,659 | 6/1988 | Bayerlein et al. ....................... 8/561 |
| 4,798,888 | 1/1989 | Symes et al. ......................... 536/123 |
| 5,016,714 | 5/1991 | McCabe et al. ...................... 166/308 |

(List continued on next page.)

OTHER PUBLICATIONS

Brochure entitled, Marine Colloids Carrageenan, General Technology For Pharmaceutical and Other Applications, FMC Corporation (1993).

Brochure Entitled "Liquid Stone™ Cementing," BJ Services, 1995.

Brochure Entitled "Carrageenan Marine Colloids, Monograph number one,"Marine Colloids Division, FMC Corporation, 1977.

*Primary Examiner*—David Bagnell
*Assistant Examiner*—Zakiya Walker
(74) *Attorney, Agent, or Firm*—O'Keefe, Egan & Peterman, LLP

(57) ABSTRACT

Storable cement slurries utilize a carrageenan suspending agent to provide stable slurries under conditions of high pH and calcium ion content. These cement slurries may be utilized for, among other things, cementing applications involving oil and gas wells.

33 Claims, 1 Drawing Sheet

U.S. PATENT DOCUMENTS

| | | | |
|---|---|---|---|
| 5,026,215 | 6/1991 | Clarke | 405/266 |
| 5,028,342 | 7/1991 | Opitz et al. | 252/8.513 |
| 5,058,679 | 10/1991 | Hale et al. | 166/293 |
| 5,106,423 | 4/1992 | Clarke | 106/789 |
| 5,141,365 | 8/1992 | Smart | 405/267 |
| 5,154,771 | 10/1992 | Wada et al. | 106/730 |
| 5,174,821 | 12/1992 | Matsuoka | 106/730 |
| 5,223,029 * | 6/1993 | Oonishi et al. | 106/35 |
| 5,301,752 | 4/1994 | Cowan et al. | 166/292 |
| 5,311,945 | 5/1994 | Cowan at al. | 166/292 |
| 5,314,022 | 5/1994 | Cowan et al. | 166/293 |
| 5,330,015 | 7/1994 | Donche et al. | 175/61 |
| 5,362,312 | 11/1994 | Skaggs et al. . | |
| 5,386,874 | 2/1995 | Laramay et al. | 166/300 |
| 5,391,359 | 2/1995 | Patel | 427/180 |
| 5,416,158 | 5/1995 | Santhanam et al. | 524/760 |
| 5,421,412 | 6/1995 | Kelly et al. | 166/300 |
| 5,447,197 | 9/1995 | Rae et al. | 166/293 |
| 5,504,061 | 4/1996 | Plank | 507/110 |
| 5,514,644 | 5/1996 | Dobson . | |
| 5,525,587 | 6/1996 | Ladret et al. | 507/110 |
| 5,547,506 | 8/1996 | Rae et al. | 106/730 |
| 5,575,335 | 11/1996 | King | 166/280 |
| 5,607,905 | 3/1997 | Dobson et al. . | |
| 5,723,416 | 3/1998 | Liao . | |
| 5,834,533 * | 11/1998 | Patel et al. | 523/130 |
| 5,975,220 | 11/1999 | Mueller et al. | 175/65 |

* cited by examiner

STORABLE LIQUID SYSTEMS FOR USE IN CEMENTING OIL AND GAS WELLS

The present application claims priority on the co-pending provisional U.S. patent application Ser. No. 60/048,718 filed May 28, 1997. The entire text of the above-referenced disclosures is specifically incorporated by reference herein without disclaimer.

BACKGROUND OF THE INVENTION

1. Field of the Invention

This invention relates generally to storable cement slurries and, more specifically, to suspending agents for storable cement slurry systems. In particular, this invention relates to iota-carrageenan suspending agents for storable cement slurry systems, such as those employed in cementing wells penetrating subterranean formations.

2. Description of Related Art

Conventional cement slurries set and develop compressive strength due to hydration. Such cement slurries are commonly used for cementing operations in subterranean well applications. For example, cement slurries may be used to cement a casing string into a borehole or to cement a pipe string, such as a liner, within another casing string. Other applications include, but are not limited to, squeeze cementing of casing perforations, liner tops, casing leaks and other remedial cement applications.

Typical cement slurries used for well cementing operations are formulated and mixed on-site using relatively complex and expensive mixing equipment. Because these cement slurries typically set quickly, they cannot be made in advance. Rather, cementing equipment and personnel are usually required to standby on location until the time for commencing cementing operations. Accordingly, any delay in drilling or workover operations during this standby time results in increased expenditure and lost time for cementing equipment and personnel.

In an attempt to address the problems associated with delays, storable cement slurries have been developed that may be mixed and stored in advance. These storable slurries may be made up in nonpressurized vessels at a location removed from the wellsite, then transported in liquid form to the wellsite and activated when ready to use. Such storable cement slurries are described in U.S. Pat. Nos. 5,447,197 and 5,547,506, which are incorporated herein by reference in their entirety.

Although previous storable cement slurries partially address the problems associated with on-site cement mixing operations, some suspending agents typically employed with these previous systems may not provide sufficient suspension time for some applications. In addition, some suspending agents potentially employed with these systems, such as polyethylene oxide, may be incompatible with other cement additives. In addition, some suspending agents typically employed with these previous storable cement systems may not provide sufficient suspension time for some applications.

SUMMARY OF THE INVENTION

In one respect, this invention is a storable cement slurry, including an aqueous base fluid, a hydraulically-active cementious material, a set retarder, and a carrageenan suspending agent. The carrageenan may be an iota carrageenan having a molecular weight of between about 150,000 and about 250,000 and may be present in the slurry in a concentration of from about 0.1 pounds per barrel to about 2 pounds per barrel.

In another respect, this invention is a method of cementing a wellbore, including the steps of introducing a storable cement slurry into the wellbore and allowing the slurry to set. The storable cement slurry typically includes an aqueous base fluid, a hydraulically-active cementious material, a set retarder, and a carrageenan suspending agent. In one embodiment, the cementious material may be at least one of slag, hydraulic cement, or a mixture thereof.

In another respect, this invention is a method of cementing a wellbore, including the steps of storing a storable cement slurry, introducing the slurry into the wellbore, and allowing the slurry to set. The storable cement slurry typically includes an aqueous base fluid; a hydraulically-active cementious material that is at least one of Portland cement, slag or a mixture thereof; a set retarder that is at least one of hydroxycarboxylic acid, gluconic acid, glucoheptonate, lignin sulfonate, sodium gluconate, phosphonate, sugar, or a mixture thereof; a dispersant that is at least one of melamine sulfonic acid polymer, sodium polyacrylate, sodium salt of naphthalene sulfonate formaldehyde condensate, napthalene sulfonic acid polymer, sulfonated styrene maleic anhydride polymer, or a mixture thereof; and an iota carrageenan suspending agent. In one embodiment, the characteristics of the storable slurry minimally change upon activation after storage. An effective amount of activator may be used to overactivate the slurry and an additional set retarder may be added to the slurry to achieve desired setting time.

DESCRIPTION OF ILLUSTRATIVE EMBODIMENTS

Figure 1:
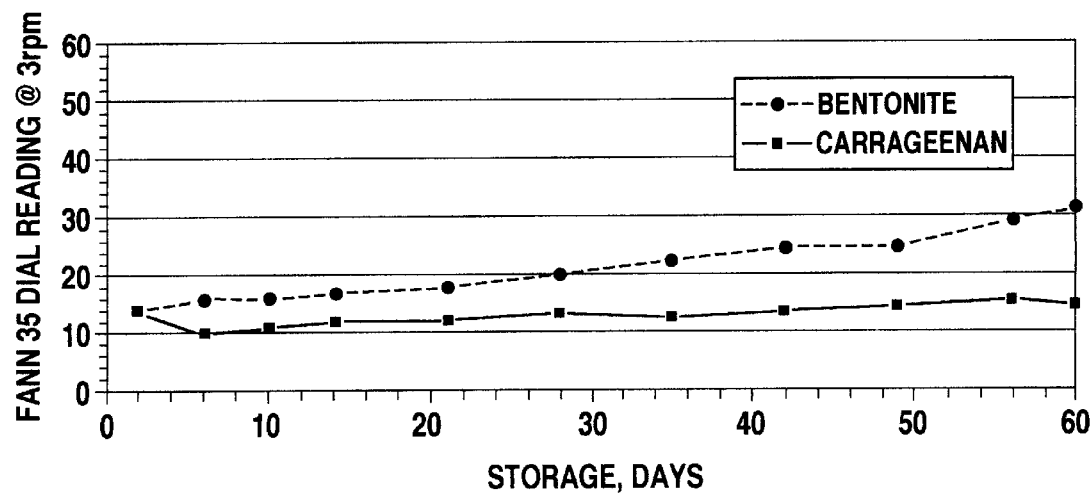
FIG. 1 shows storage rheology as a function of storage time according to Comparative Example A.

Embodiments of the disclosed method and compositions offer improvements in storable cement slurries over those previously employed. In these embodiments, carrageenan and carrageenan-like materials are used to suspend hydraulically active cementious materials such as those described in U.S. Pat. Nos. 5,447,197 and 5,547,506 which have been incorporated herein by reference. In this regard, carrageenan materials act as superior suspending agents for many materials including, but not limited to, Portland cements, slagments, flyash, slag or blends thereof, silica sand/flour, and/or weighing agents including hematite or barite. Surprisingly, carrageenan, a high molecular weight polysaccharide derived from seaweed, produces an exceptionally stable storable liquid that is superior to previously known suspending/thixotropic agents typically employed in storable cement slurries, such as welan gum, xanthan gum, cellulose, polyanionic cellulose, carboxymethyl-hydroxyethyl-cellulose, guar and its derivatives, starch, succinoglycan, polyethylene oxide, bentonite, attapulgite, mixed metal hydroxides, oil in water emulsions created with paraffin oil and stabilized with ethoxylated surfactants, etc.

In particular, embodiments of the disclosed carrageenan suspending agent provides a number of advantages compared to previous suspending agents typically employed with storable cement agents, such as polyethylene oxide and bentonite. Among other things, carrageenan offers better stability and resistance to the harsh chemical environment typically found in most storable cementitious slurries, i.e., high pH and calcium ion content, particularly when Portland cement is used. For example, previous storable cement slurry systems may become unsuitable for use during storage periods, even though the slurry may not set hard during the storage period. This may occur due to deterioration in the carrier fluid system leading to sedimentation of solid particles and the formation of free water, or conversely, unacceptably high gellation. This detrimental effect of fluid environments typically occurs to naturally occurring organic polymers. Consequently, non-naturally occurring suspending agents and clays, such as polyethylene oxide and bentonite have typically been employed in storable cement system. However, non-naturally occurring polymers, such as polyethylene oxide may be incompatible with conventional cementing additives. For example, polyethylene oxide may form a highly viscous mass unsuitable for well cementing when it is exposed to conventional cementing additives.

Unexpectedly, carrageenan, a naturally occurring polysaccharide, has been found to be a superior suspending agent to both these non-naturally occurring suspending agents, and prior naturally occurring suspending agents. In the practice of the disclosed method, carrageenan materials are employed. Carrageenans, or carrageenan gums, are typically derived from seaweed and are ionic linear polysaccharides comprising repeating galactose units which individually may be sulfated or unsulfated. Specific carrageenan types include kappa, iota and lambda carrageenans. Typically, iota carrageenan is employed. Mixtures of carrageenan types are also possible. Properties of individual carrageenan types primarily depend on the number and position of sulfate groups on the repeating galactose units. In the presence of excess cations, kappa and iota carrageenans form gels. Cations that may be associated with carrageenan sulfate groups include, but are not limited to, ammonium, calcium, magnesium, potassium, and sodium cations.

In the practice of the disclosed method and compositions, any carrageenan or carrageenan-like material suitable for forming a gel (including thixotropic gels) and/or otherwise acting as a suspending agent may be employed. As previously mentioned, iota carrageenan is most typically employed in calcium environments of the disclosed method. Iota carrageenan is one of three closely related polymers consisting of substituted galactogalactose. Iota carrageenan primarily comprises repeating D-galactose and 3, 6 anhydro-D-galactose units, both sulfated and non-sulfated, joined by alternating 1-3 and β 1-4 glycosidic linkages. For example, in one embodiment of the disclosed method, an iota carrageenan typically comprises about 30% 3, 6 anhydrogalactose and about 32% ester sulfate. However, any other form of iota carrageenan or variant or modification thereof may also be employed. Although iota carrageenan is typically employed in calcium environments, it may be employed in environments containing other types of cations including, but not limited to, potassium, magnesium, etc. Most typically, a divalent cation is employed with iota-carrageenan.

Iota carrageenan is substantially salt-tolerant and forms substantially soft, elastic gels when exposed to cations. Such gels may be formed by exposing iota carrageenan to any suitable cation. As previously mentioned, cations employed are typically divalent, such as calcium and magnesium. However, other types of cations, such as potassium, may be employed. Most typically, iota carrageenan gels are formed in the presence of calcium cations. These gels tend to be linear in nature, without cross-linking, and form helical self-structuring polymer chains in the presence of calcium ions. Advantageously, the elastic nature of an iota carrageenan gel, its stability in the presence of calcium ions and high pH, as well as its tendency to reform or re-gel after shearing, make it ideal as a suspending agent for use in storable cement slurries.

Although any carrageenan suitable for forming gels and/or otherwise acting as a suspension agent in a calcium environment may be employed in the disclosed method (including those carrageenans having a molecular weight greater than about 500,000 and less than about 75,000), typically a carrageenan has a molecular weight of between about 75,000 and about 500,000. More typically in the practice of the disclosed method, a carrageenan has a molecular weight of between about 150,000 and about 250,000, and even more typically a carrageenan has a molecular weight of about 200,000. Most typically, an iota carrageenan having these molecular weight ranges is employed. Carrageenans having any viscosity suitable for use for a selected application may be employed in the disclosed method, however in one embodiment the viscosity of a 1.5% iota carrageenan solution at 75° C. and 60 RPM is between about 30 mPa.s and about 60 mPa.s.

A specific example of a suitable iota carrageenan composition for use in the disclosed method is commercially available as "VISCARIN SD-389" available from FMC Food Ingredients Division. This product is also known as "LSS-1" from BJ Services Company. Other iota carrageenan examples include "GELCARIN GP-359," "GELCARIN GP-379," and "SEASPEN IN" (which also contains phosphates and $CaSO_4.2H_2O$), also available from FMC Food Ingredients Division. In addition to these carrageenans, other suitable commercially available carrageenan compositions include, but are not limited to, carrageenan materials available from FMC Europe NV of Brussels Belgium; Chemcolloids Ltd. of Bosley, UK; Aqualon, Reigate, Surrey, UK; and Ashland Chemical Company, Dublin, Ohio. Further information on carrageenans may be found in "Carrageenan", Monograph Number One, Marine Colloids Division, FMC Corporation; "Marine Colloids Carrageenan, General Technology for Pharmaceutical and Other Applications," FMC Corporation, 1993, which are incorporated herein by reference in their entirety.

In the practice of the disclosed method, a carrageenan is typically hydrated prior to addition to or combination with other components of a storable cement slurry. In this regard, some iota carrageenan materials may require heating to above the solubility temperature to achieve hydration, for example to about 80° C. Such iota carrageenan materials include "hot water soluble" iota carrageenans, such as "GELCARIN GP-359" or "GELCARIN GP-379" available from FMC Marine Colloids Division. In other cases, an iota carrageenan material may be hydrated without prior heating in the present of sodium ions. Examples of such iota carrageenan materials include "cold water soluble" iota carrageenans, which are soluble at temperatures of about 20° C. without prior heating as long as sodium is present, such as in the form of sodium hydroxide or sodium carbonate. These "cold water soluble" iota carrageenans may swell in the presence of divalent calcium ions to form thixotropic dispersions or gels, even in the absence of sodium. Such iota carrageenan materials include iota carrageenans, such as "VISCARIN SD-389" available from FMC Marine Colloids Division. In any case, as the temperature increases, higher concentrations of calcium ions may be required for some carrageenan materials to obtain a similar gelling effect. In this regard, it will be understood that optimization of gelling in relation to temperature and ion content may be accomplished with benefit of this disclosure using skills known in the art, and that ion content may be adjusted in a number of ways, including by adding additional ion-containing material to a carrageenan- containing solution.

Storable cement slurries containing carrageenan suspending agent may be formulated using methods and compositions described in U.S. Pat. No. 5,447,197, which have been incorporated herein by reference. In this regard, carrageenan-containing storable cement slurries may employ carrageenan in combination with any of the materials listed in U.S. Pat. Nos. 5,447,197 and 5,547,506 including, but not limited to, inorganic cements, hydraulic cements, activators, extenders, cementious materials, sand, aggregate material, strength enhancers, granular filling materials, slag, slagments, set retarders, other suspending agents, dispersing agents, mixing water, fluid loss additives, gelling agents, etc. In this regard, the same concentration levels of these materials described in U.S. Pat. Nos. 5,447,197 and 5,547,506 (which have been incorporated by reference herein) may be employed with the disclosed carrageenan suspending agents. In addition, carrageenan-containing storable cement slurries may be formulated using techniques as described in U.S. Pat. Nos. 5,447,197 and 5,547,506.

Set retarders as described in U.S. Pat. Nos. 5,447,197 and 5,547,506 may be employed. Examples of set retarders include, but are not limited to, gluconic acid and gluconates, such as sodium gluconate, calcium gluconate, and magnesium gluconate; lignin sulfonates, such as sodium lignosulfonate and calcium sodium lignosulfonates; gluconates such as sodium gluconate, calcium gluconate, and calcium sodium gluconate; phosphonates, such as EDTM phosphonic acid or DTPM phosphonic acid; sugars, such as sucrose; hydroxycarbolic acids, such as citric acid; and the like, as well as their blends. As applicable, the improved storable liquid system may employ these set retarders to control thickening time.

Activators (or activation agents) and activation methods as described in U.S. Pat. Nos. 5,447,197 and 5,547,506 may also be employed, including "over-activation." Activators are typically added just prior to use of a storable cement slurry. Typical activators include, but are not limited to, solutions of Group IA and IIA hydroxides, such as sodium hydroxide, magnesium hydroxide and calcium hydroxide; sulfates, such as sodium sulfate; aluminates, such as sodium aluminate and potassium aluminate; carbonates, such as sodium carbonate; silicates; and amines (such as triethanolamine ("TEA"), diethanolamine, etc.). Most typical activators are sodium silicates. Typical concentrations of activator range from 0 to about 8 gallons per barrel ("GPB") of slurry, typically about 1 to about 3 GPB of slurry and are typically added with additional mix water.

There are two approaches typically employed for controlling the thickening time of activated storable slurries. The first approach is to accurately meter or measure out the activator is based on a dose-response curve so the stored slurry becomes "less retarded" and provides the desired thickening time. Because the slope of the dose-response curve may be steep, the slurries may be too sensitive to permit the accurate control of thickening at the wellsite. "Over-activation" of a slurry as described in U.S. Pat. Nos. 5,447,197 and 5,547,506 may also be employed. In such a case, additional or secondary set retarders, such as lignin sulfonates, tartrates, gluconic acid, gluconates, glucoheptonates, and the like, may be added to achieve the desired thickening time. The "over-activated" slurries typically respond normally to conventional levels of retarder and typically exhibit far less sensitivity. In addition, "over-activation" may boost the early compressive strength of the set slurries. A typical concentration of additional set retarder (for example, sodium lignosulfonate "R12-1", 40% active, Boregard, Sarpsborg, Norway) ranges from 0 to about 1 gpb, although other amounts may be employed.

It will be understood with benefit of this disclosure that although an activator is typically employed, this is not always necessary. For example in cases where a specific storable cement slurry is exposed to temperature high enough for the slurry to be activated by temperature alone, no activator may be necessary. Such conditions will vary according to individual cement slurry characteristics and will be apparent to those of skill in the art with benefit of this disclosure. This phenomenon is further illustrated by the data of Example 1.

Although any concentration range of components suitable for formulating a storable cement slurry may be employed, in one exemplary embodiment a storable cement slurry comprising slagment may be formulated using from about 10 to about 500 pounds per barrel by volume of storable cement premix ("PPB") Portland cement, from about 10 to about 500 PPB slag, from about 5 to about 200 PPB silica sand, together with carrageenan suspending agent, set retarder/s and dispersant/s in amounts as described elsewhere herein. As used herein, a "storable cement premix" refers to a storable cement slurry prior to activation (e.g., aqueous base fluid, hydraulically-active cementious material, set retarder, carrageenan suspending agent, optional dispersant). For example, a storable cement slurry comprising slagment may be formulated using 124 lb ASTM Portland Cement, 124 lb ground granulated blast furnace slag (available from Blue Circle of the United Kingdom), 87 lb silica sand, 0.5 lb "LSS-1," 0.2 gallon "LSR-1," 0.1 gallon "LSP-1," (the preceding three components being further identified below) and 20.74 gallon water. In this regard, slagment may be described as "latently hydraulic" and typically does not react at surface conditions. Slagment slurries may be activated by, for example, elevated downhole temperatures and/or activators (such as sodium silicate).

In another embodiment, the improved disclosed suspending agent may also be used to formulate storable slurries of auxiliary cementing materials or particulate additives, such as weighting agents, proppants, fluid loss materials, etc. Particular examples of such materials include, but are not limited to, sand, silica flour, hematite, barite, ilmenite, hausmanite, as well as mixtures thereof These fluids may be admixed with the storable cement or conventional cement slurry to form, for example, weighted and/or thermally stabilized cement slurries. In this regard, storable cement and storable auxiliary material slurries are typically combined at the wellsite. However, such slurries may also be combined at non-wellsite locations (such as a bulk plant or mixing yard) and stored prior to transportation to the wellsite, so as to eliminate problems associated in the remote handling, metering, and addition of solids. Furthermore, storable slurries of auxiliary materials may also be employed in non-cementing applications, such as for use in fluids formulated to suspend proppant in fracture fluids, sand in gravel pack fluids, weighting agents, kill fluids or fluid loss materials in workover and drilling fluids, etc.

A storable system of cement or auxiliary materials may be formulated depending on characteristics of the cementious material/s or auxiliary material/s to be suspended (e.g., based on density, particle size, etc.). However, a base formulation typically employs "LSS-1" carrageenan suspending agent at concentrations of between about 0.05% to about 1% BWOW (or between about 0.1 and about 2 PPB), more typically between about 0.2 and about 0.5% BWOW (or between about 0.3 and about 1 PPB), and most typically about 0.3% BWOW (or about 0.5 PPB). It will be understood with benefit of this disclosure that ranges of carrageenan suspending agent may vary substantially with type of carrageenan selected. In many cases, a substantially greater concentration of different type of carrageenan material may be required to achieve the same effect given by the above "LSS-1" concentrations. A carrageenan-containing storable cement slurry may also optionally include other suspending agents including, but not limited to those described in U.S. Pat. Nos. 5,447,197 and 5,547,506, which have been incorporated herein by reference.

The disclosed storable cement and auxiliary material slurries also typically employ a set retarder. In a typical embodiment, the set retarder is in the form of a gluconic acid set retarder (such as "LSR-1" available from BJ Services Company). However, any other suitable concentration of set retarder, or suitable set retarder type may be employed including, but not limited to, those set retarders described in U.S. Pat. Nos. 5,447,197 and 5,547,506, which have been incorporated herein by reference. Gluconic acid set retarders such as "LSP-1" are typically employed at a concentration of between 0.05 and about 2 GPB or, alternatively between about 0.1% to about 5% BWOC. These concentrations of set retarder may be employed with any of the concentration ranges of carrageenans described elsewhere herein.

The disclosed storable cement and auxiliary material slurries may also employ a dispersant. In a typical embodiment, the dispersant is in the form of a polyacrylate or as a sodium salt of naphthalene sulfonate formaldehyde condensate. However, any other suitable concentration of dispersant, or suitable dispersant type may be employed including, but not limited to, those dispersants described in U.S. Pat. Nos. 5,447,197 and 5,547,506, which have been incorporated herein by reference. Most typically, an acrylic acid homopolymer/sodium polyacrylate dispersant, such as "BEVALOID 6670" commercially available from Rhone Poulanc is employed. This dispersant is also available from BJ Services as "LSP-1 LIQUID STONE PLASTICIZER." Another example typical dispersant is napthalene-sulfonate (available from BJ Services as "CD-31"). In one typical embodiment, "LSP-1" is employed at a concentration of between about 0.1% to about 3.0% BWOW (or between about 0.05 to about 0.5 GPB), and more typically between about 1.5% to about 2% BWOW. In another typical embodiment, "CD-31" is employed at a concentration of between about 0.1% and about 2% BWOW (or between about 1 to about 10 PPB), and more typically between about 0.5% and about 1% BWOW. These concentrations of dispersant may be employed with any of the concentration ranges of carrageenans described elsewhere herein.

A storable auxiliary system is typically prepared by hydrating carrageenan in fresh water, and then slowly introducing auxiliary product into the hydrated carrageenan solution while circulating and agitating. The solution typically supports the auxiliary materials using the carrageenan and dispersant ranges given above, with the amount of auxiliary material varying depending on the type of auxiliary material added and the desired characteristics of a storable auxiliary system, such as the desired density of an auxiliary system. In this regard, such amounts of auxiliary material may be selected and/or varied by those of skill in the art with benefit of this disclosure. In one example embodiment, a liquid haematite auxiliary storable system may be formulated as described in Example 3.

In one example embodiment, a storable silica sand system may be formulated with mix water using approximately 100 US mesh sand at a concentration of about 20 pounds per gallon added ("PPGA"). Concentrations of other additives, including carrageenan and dispersant, are typically of the type and added in the ranges described above for storable auxiliary system formulations.

In another example embodiment, a stable suspension of silica flour and/or sand may be prepared and mixed "on the fly" with a storable or conventional cement slurry to obtain a cement slurry with improved strength and/or which helps counteract strength retrogression (i.e., decline in strength and increase in permeability of cement) such as that encountered, for example, in wells having bottom hole static temperatures of higher than about 230° F. This may be accomplished without the costly and time-consuming dry-blending of cement and silica ahead of a job. It also helps eliminate the generation of "junk cement." Although any amounts may be employed, such silica is typically incorporated at an amount of from about 30% to about 49% BWOC for reasons of stoichiometry.

In another example embodiment, high density slurries or spacers may be pre-slurried into storable, water-based suspensions and then mixed with a storable or conventional cement slurry "on the fly." Such high density slurries may include finely ground solids of high intrinsic specific gravity. Specific examples include, but are not limited to, barite, haematite, ilmenite, hausmanite, magnesium oxide and mixtures thereof. Depending upon the weighting agent selected, storable auxiliary material slurries may be formulated, for example, to have a specific gravity of between about 3.0 to about 3.5, and in another embodiment to have a specific gravity of greater than about 3.5.

In a typical embodiment, a carrageenan-containing storable cement slurry is formulated by first combining carrageenan polymer material with fresh potable water to allow substantially full hydration prior to the addition of any ion-containing materials. Typically the carrageenan is added slowly to the water to permit full hydration without formation of lumps. Hydration time varies according to the grade and temperature requirements of the polymer type utilized, and may be determined by those of skill in the art with benefit of this disclosure. After the carrageenan polymer is substantially fully hydrated, the other components of the storable slurry are typically added next. In this regard, set retarder, dispersant, and other non-cementious material is typically added to the slurry first and mixed in thoroughly. After a homogenous mixture has been obtained, the cementious material is typically added. At this time it is typically desirable to check the density of the slurry prior to storing. The slurry is then ready for storage prior to eventual use for oil/gas well or other cementing purposes. It is typically desirable to monitor the condition of the slurry occasionally during storage. When ready for use, the slurry may be transferred to a job or well site and activation/modification chemicals added. In the case of oil/gas well cementing the activation/modification chemicals may be added either by batch or "on the fly" and the slurry then pumped into the well.

It will be understood with benefit of this disclosure by those of skill in the art that the disclosed carrageenan-containing storable cement slurries may be formulated, stored and subsequently employed for virtually any cementing task, not only in oil and gas related applications, but in cementing operations that occur, for example, at surface or near surface conditions. Such applications include, but are not limited to, cementing related to construction, buildings, underground conduit installation, etc.

EXAMPLES

The following examples are illustrative and should not be construed as limiting the scope of the invention or claims thereof.

Example 1

Carrageenan-Based System

An example of one embodiment of an improved 16.2 ppg Portland cement storable liquid system including Holnam H cement, carrageenan ("LSS-1" available from BJ Services Company), a gluconic acid set retarder ("LSR-1" available from BJ Services Company), an acrylate dispersant ("LSP-1" available from BJ Services Company), and 200 mesh silica flour ("S-8" available from BJ Services Company), is contained in Tables 1 and 2. As indicated by the results in Tables 1 and 2, the storable slurry of this embodiment remains stable for extended periods of time without solids settling. The storable Portland cement slurry of this embodiment also produced a consistent thickening time at the 270° F. test condition over a period of 14 days. Note: The test temperature was sufficient to initiate the settling process without the use of additional activators.

Referring in particular to Table 1, the compressive strength development of the improved storable liquid cement is also quite good. This particular design had a thickening time of 5:09 at 270° F. When tested for compressive strength on an ultrasonic cement analyzer (UCA), the design obtained an initial compressive strength of 50 psi in 8 hours 9 minutes. 500 psi was obtained in 10 hours and 11 minutes. Twenty-four hour compressive strength was 3750 psi. These values are normal for a conventionally retarded Portland cement system, indicating that the improved slurry design, once activated, exhibited normal strength development.

Table 2 shows results for a second batch of 16.2 ppg Portland cement storable liquid system using a different mill run of Holnam H cement and including carrageenan according to the formulation of the cement in Table 1.

Table 3 illustrates another formulation of a 16.2 ppg Portland cement storable liquid system including carrageenan. This formulation is the same as the formulation of Table 1 and Table 2, except that a synthetic phosphonate retarder ("SR-30", available from BJ Services) was employed. In this case, satisfactory results were achieved, although thickening times for this slurry formulation were less than thickening times for the storable slurry compositions of Examples 1 and 2.

TABLE 1

35% BWOC "S-8" + 1.3% BWOW "LSP-1" + 0.31% BWOW "LSS-1" + 1.0% BWOW "LSR-1"
(or 35% "S-8" BWOC + 0.3 GPB "LSP-1" + 0.5 PPB "LSS-1" + 0.2 GPB "LSR-1")

| Cement (Brand) | Temp (° F.) | Age of (Base Fluid) | Thickening Time (Hours) | Base fluid rheologies-80° F. (FANN 35 RPM Readings) 600/300/200/100/6/3 |
|---|---|---|---|---|
| Holnam H | 270 | 15 Hr | 5:50 | 536/310/228/138/24/16 |
| Holnam H | 270 | 29 Hr | 5:09 | 523/310/230//141/24/17 |
| Holnam H | 270 | 53 Hr | 6:26 | 540/321/236/144/24/17 |
| Holnam H | 270 | 77 Hr | 5:03 | 300+/298/218/138/22/15 |
| Holnam H | 270 | 125 Hr | 6:36 | 488/282/208/126/21/14 |
| Holnam H | 270 | 149 Hr | 4:20 | 502/293/212/126/20/14 |
| Holnam H | 270 | 173 Hr | 6:15 | 530/308/222/134/22/16 |

TABLE 2

35% BWOC "S-8" + 1.3% BWOW "LSP-1" + 0.31% BWOW "LSS-1" + 1.0% BWOW "LSR-1"
(or 35% "S-8" BWOC + 0.3 GPB "LSP-1" + 0.5 PPB "LSS-1" + 0.2 GPB "LSR-1")

| Cement (Brand) | Temp (° F.) | Age of (Base Fluid) | Thickening Time (Hours) | Base fluid rheologies-80° F. (FANN 35 RPM Readings) 600/300/200/100/6/3 |
|---|---|---|---|---|
| Holnam H | 270 | 24 Hr | 4:09 | 418/246/182/112/20/14 |
| Holnam H | 270 | 144 Hr | 5:31 | 430/242/176/105/17/12 |
| Holnam H | 270 | 192 Hr | 4:40 | 352/215/160/95/16/11 |
| Holnam H | 270 | 216 Hr | 4:27 | 386/216/160/96/16/12 |
| Holnam H | 270 | 288 Hr | 4:19 | 347/200/156/97/20/15 |
| Holnam H | 270 | 312 Hr | 6:05 | 336/200/156/98/22/18 |
| Holnam H | 270 | 336 Hr | 3:00 | 352/230/183/119/32/28 |

TABLE 3

35% BWOC "S-8" + 1.3% BWOW "LSP-1" + 0.31% BWOW "LSS-1" + 0.4% BWOC "SR-30"

| Cement Brand | Temp ° F. | Age of (Base Fluid) Base Fluid | Thickening Time (Hours) Time | Base fluid rheologies-80° F. (FANN 35 RPM Readings) 600/300/200/100/6/3 |
|---|---|---|---|---|
| Holnam H | 270 | 24 Hr | 1:58 | 290/172/128/77/14/9 |
| Holnam H | 270 | 96 Hr | 1:26 | 300+/206/153/94/18/14 |

Example 2 and Comparative Examples A–E

In previous storable cement slurries, both gellation and settling have been noted with bentonite based systems and systems based on other suspending agents. Sometimes severe gellation effects may occur. In this regard, a suitable method to evaluate and quantify the performance of a suspending system is to measure the rheology of the fluid using a FANN 35 rheometer fitted with the standard Rotor 1, Bob 1, Spring 1 combination at low rotational speed and at room temperature. This is done following stirring the sample by hand, and mixing the fluid by using the Fann 35 at 600 RPM for one minute to remove any gellation.

In the following examples, 16 ppg API Class G Portland cement based storable systems were formulated using 1.3% LSP-1 (0.3 GPB) acrylate dispersant, 1% LSR-1 (0.2 GPB) gluconic acid set retarder and fresh water. In each case, a different suspending agent was tested.

Example 2 and Comparative Example A

Table 4 and FIG. 1 clearly indicate the evolving low shear rate viscosity of a 4 PPB bentonite based system (Comparative Example A) compared with one embodiment of the disclosed carrageenan-based system (Example 2). As seen in the Table 4 and FIG. 1, the bentonite based system exhibited moderate bleed water, exceeded a Fann reading of 20 in less than 30 days, and had a Fann reading of greater than 30 at 60 days (by "bleed water" is meant the supernatant fluid which may form on the surface of a cement slurry after it has remained static for some time). In contrast, the carrageenan based system exhibited only a trace of bleed water, maintained an acceptable Fann reading of about 15 or less for a time period up to 60 days, and may be expected to yield acceptable rheologies for time periods up to and exceeding 100 days, while at the same time offering compatibility with other additives in the slurry.

TABLE 4

| Storage Time, Days | Example 2 -- Carrageenan | | Comparative Example A -- 4 PPB of Total Slurry Bentonite | |
|---|---|---|---|---|
| | FANN Reading | Comments | FANN Reading @ 3 RPM | Comments |
| 2 | 14 | Trace of bleed water | 14 | Moderate bleed water |
| 6 | 10 | Trace of bleed water | 16 | Moderate bleed water |
| 10 | 11 | Trace of bleed water | 16 | Moderate bleed water |
| 14 | 12 | Trace of bleed water | 17 | Moderate bleed water |
| 21 | 12 | Trace of bleed water | 18 | Moderate bleed water |
| 28 | 13 | Trace of bleed water | 20 | Moderate bleed water |
| 35 | 12 | Trace of bleed water | 22 | Moderate bleed water |
| 42 | 13 | Trace of bleed water | 24 | Moderate bleed water |
| 49 | 14 | Trace of bleed water | 24 | Moderate bleed water |
| 56 | 15 | Trace of bleed water | 29 | Moderate bleed water |
| 60 | 14 | Trace of bleed water | 31 | Moderate bleed water |

Comparative Examples B–E

Tables 5–8 illustrate performance of storable systems employing hydroxy ethyl cellulose ("HEC"), polyacrylic acid, polyethylene oxide and xanthan suspending agents, respectively (Comparative Examples B–E). As may be seen in the tables, the HEC-based system exhibited very bad bleed water and had a FANN reading exceeding 25 after 10 days. The polyacrylic-based system exhibited extremely bad bleed water, although Fann readings were not obtained after 6 days. The polyethylene oxide-based system was thixotropic, hard to stir, exhibited bleed water and was very thick after 21 days. The xanthan-based system had a FANN reading exceeding 20 after 20 days and exhibited bad bleed water, increasing free water, and bad separation at 20 days. Thus, only carrageenan of Example 2 gave stable rheology and freedom from bad free water/gellation over time.

TABLE 5

0.4% HEC BY WEIGHT OF MIX WATER

| Day | FANN 3 RPM Reading | Observations |
|---|---|---|
| 0 | 9 | Very bad bleed water |
| 2 | 12 | Very bad bleed water |
| 6 | 16 | Very bad bleed water |
| 10 | 25 | Very bad bleed water |
| 14 | 31 | Very bad bleed water |

TABLE 6

0.4% POLYACRYLIC

| Day | FANN 3 RPM Reading | Observations |
|---|---|---|
| 0 | 4 | Extremely bad bleed water |
| 2 | 5 | Extremely bad bleed water |
| 6 | 8 | Extremely bad bleed water |

TABLE 7

1.2 PPB POLYETHYLENE OXIDE BY WEIGHT OF MIX, WATER

| Day | FANN 3 RPM Reading | Observations |
|---|---|---|
| 0 | 11 | Thixotropic, hard to stir, bleed water |
| 4 | 2 | Thixotropic, hard to stir, bleed water |
| 8 | 4 | Thixotropic, hard to stir, bleed water |
| 10 | 3 | Thixotropic, hard to stir, bleed water |
| 21 | 10 | very thick |

TABLE 8

0.8 PPB XANTHAN POLYMER BY MIX WATER

| Day | FANN 3 rpm reading | Observations |
|---|---|---|
| 0 | 12 | bad bleed water |
| 4 | 10 | increasingly bad bleed water |
| 8 | 11 | increasingly bad bleed water |
| 12 | 12 | increasingly bad bleed water |
| 16 | 15 | increasingly bad bleed water |
| 20 | 24 | bad separation |

Example 3
Use of Storable Auxiliary Material System to Increase Cement Density

A storage hematite auxiliary system may be formulated with a density of about 27 ppg (3200 kg/m$^3$) by mixing about 963 PPB haematite, 18.6 GPB fresh water, 0.6 PPB "LSS-1," and 0.3 GPB "LSP-1." When combined with a 16 lbm/gal liquid storable cement system, final slurry density may be selectively increased as indicated in Table 9.

TABLE 9

SLURRY DENSITY OF COMBINED LIQUID CEMENT PREMIX AND LIQUID WEIGHTING AGENT

| Auxiliary System - Haematite (Liquid Weight Agent) Volume (bbl) | Cement System - Liquid Cement Pre-Mix Volume (bbls) | Final Slurry Density | |
|---|---|---|---|
| | | kg/cu.m | lbm/gal |
| 0 | 1 | 1900 | 16.0 |
| 1 | 0 | 3200 | 27 |
| 1 | 3 | 2260 | 18.8 |
| 2 | 3 | 2460 | 20.5 |
| 1 | 1 | 2600 | 21.5 |
| 2 | 1 | 2770 | 23.1 |
| 3 | 1 | 2880 | 24.0 |

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A storable cement slurry, comprising:
   an aqueous base fluid;
   a hydraulically-active cementious material;
   a set retarder; and
   an effective amount of iota carrageenan suspending agent.

2. The slurry of claim 1, wherein said iota carrageenan has molecular weight of between about 150,000 and about 250,000.

3. The slurry of claim 1, wherein said iota carrageenan is present in said slurry in a concentration of from about 0.1 pounds per barrel to about 2 pounds per barrel.

4. The slurry of claim 3, wherein said set retarder is gluconic acid present in an amount of between about 0.05 gallons per barrel and about 2 gallons per barrel and wherein said cementious material is slagment.

5. The slurry of claim 1, further comprising an activator.

6. The slurry of claim 5, wherein said activator is sodium silicate.

7. The slurry of claim 1, wherein said set retarder is at least one of hydroxycarboxylic acid, gluconic acid, glucoheptonate, lignin sulfonate, sodium gluconate, phosphonate, sugar, or a mixture thereof.

8. The slurry of claim 1, wherein said set retarder is gluconic acid.

9. The slurry of claim 1, wherein said cementious material is at least one of slag, hydraulic cement, or a mixture thereof.

10. The slurry of claim 1, further comprising a dispersant.

11. The slurry of claim 10, wherein said dispersant is at least one of melamine sulfonic acid polymer, sodium polyacrylate, sodium salt of naphthalene sulfonate formaldehyde condensate, napthalene sulfonic acid polymer, sulfonated styrene maleic anhydride polymer, or a mixture thereof.

12. The slurry of claim 11, where in said dispersant is at least one of sodium polyacrylate, sodium salt of naphthalene sulfonate formaldehyde condensate, or a mixture thereof.

13. The slurry of claim 1, wherein said slurry consists essentially of an aqueous base fluid, Portland cement, a set retarder, and an effective amount of iota carrageenan suspending agent.

14. A method of cementing a wellbore, comprising:
   introducing a storable cement slurry into said wellbore, said storable cement slurry comprising an aqueous base fluid, a hydraulically-active cementious material, a set retarder, and an effective amount of iota carrageenan suspending agent;
   allowing said slurry to set.

15. The method of claim 14, wherein said iota carrageenan has molecular weight of between about 150,000 and about 250,000.

16. The method of claim 14, further comprising the step of activating said storable cement slurry by combining an activator with said slurry.

17. The method of claim 16, wherein said activator is sodium silicate.

18. The method of claim 14, wherein said set retarder is gluconic acid.

19. The method of claim 14, wherein said cementious material is at least one of slag, hydraulic cement, or a mixture thereof.

20. The method of claim 14, further comprising a dispersant.

21. The method of claim 14, wherein said storable cement slurry consists essentially of an aqueous base fluid, Portland cement, a set retarder, and an effective amount of iota carrageenan suspending agent.

22. A method of cementing a wellbore, comprising:
   storing a storable cement slurry, said storable cement slurry comprising:
      an aqueous base fluid,
      a hydraulically-active cementious material, wherein said cementious material is at least one of Portland cement, slag or a mixture thereof,
      a set retarder, wherein said set retarder is at least one of hydroxycarboxylic acid, gluconic acid, glucoheptonate, lignin sulfonate, sodium gluconate, phosphonate, sugar, or a mixture thereof,
      a dispersant, wherein said dispersant is at least one of melamine sulfonic acid polymer, sodium polyacrylate, sodium salt of naphthalene sulfonate formaldehyde condensate, napthalene sulfonic acid polymer, sulfonated styrene maleic anhydride polymer, or a mixture thereof, and
      an effective amount of iota carrageenan suspending agent;
   introducing said slurry into said wellbore; and
   allowing said slurry to set.

23. The method of claim 22, wherein said iota carrageenan has molecular weight of between about 150,000 and about 250,000.

24. The method of claim 22 further comprising the step of activating said storable cement slurry by combining an activator with said slurry.

25. The method of claim 24, wherein said activator is sodium silicate.

26. The method of claim 22, wherein set characteristics of said storable slurry minimally change upon activation after storage.

27. The method of claim 26, wherein said iota carrageenan is present in said slurry in a concentration of from about 0.1 pounds per barrel to about 2 pounds per barrel.

28. The method of claim 26, wherein an effective amount of activator is used to over-activate said slurry and an additional set retarder is added to said slurry to achieve desired setting time.

29. The method of claim 26, wherein said dispersant is at least one of melamine sulfonic acid polymer, sodium polyacrylate, sodium salt of naphthalene sulfonate formaldehyde condensate, napthalene sulfonic acid polymer, sulfonated styrene maleic anhydride polymer, or a mixture thereof.

30. The method of claim 29, wherein said dispersant is at least one of sodium polyacrylate, sodium salt of naphthalene sulfonate formaldehyde condensate, or a mixture thereof.

31. The method of claim 26, wherein said dispersant is sodium polyacrylate.

32. The method of claim 26, wherein said set retarder is gluconic acid is present in an amount ranging from about 0.05 gallons per barrel to about 2 gallons per barrel.

33. The method of claim 26, wherein said cementious material is slagment.

* * * * *